US010217116B1

(12) United States Patent
Lopez et al.

(10) Patent No.: US 10,217,116 B1
(45) Date of Patent: Feb. 26, 2019

(54) GENERATING OFFERS FOR THE PURCHASE OF PRODUCTS

(75) Inventors: Gustavo Eduardo Lopez, Seattle, WA (US); Aditya B. Pande, Hyderabad Andhra Pradesh (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 2075 days.

(21) Appl. No.: 12/188,454

(22) Filed: Aug. 8, 2008

(51) Int. Cl.
*G06Q 30/06* (2012.01)
*G06Q 30/02* (2012.01)

(52) U.S. Cl.
CPC ......... *G06Q 30/02* (2013.01); *G06Q 30/0204* (2013.01)

(58) Field of Classification Search
USPC ........ 705/7, 10, 26.7, 26.1, 37, 14.69, 26.62
See application file for complete search history.

(56) References Cited

U.S. PATENT DOCUMENTS

| 2001/0032128 | A1* | 10/2001 | Kepecs ............................ 705/14 |
| 2003/0158776 | A1* | 8/2003 | Landesmann ................... 705/14 |
| 2004/0044566 | A1* | 3/2004 | Bostelmann et al. ........... 705/14 |
| 2005/0071223 | A1* | 3/2005 | Jain et al. ........................ 705/14 |
| 2007/0239515 | A1* | 10/2007 | Hernandez et al. ............. 705/10 |
| 2007/0299743 | A1* | 12/2007 | Staib et al. ...................... 705/27 |
| 2008/0222004 | A1* | 9/2008 | Pollock et al. .................. 705/26 |
| 2008/0270363 | A1* | 10/2008 | Hunt et al. ........................ 707/3 |
| 2008/0294583 | A1* | 11/2008 | Hunt et al. ...................... 706/46 |

\* cited by examiner

*Primary Examiner* — Akiba K Allen
(74) *Attorney, Agent, or Firm* — Thomas | Horstemeyer, LLP (57) ABSTRACT

Various systems, methods and other embodiments are provided for generating offers for the purchase of products. In one embodiment, transaction data is stored in a data store. The transaction data comprises a record of a plurality of transactions for the purchase of products through a plurality of channels of commerce. Requests are received in a server from clients for an offer in association with an interaction involving a product. Each request includes a tag indicating at least one of the channels of commerce associated with the interaction. For each request, an offer is generated in response to the request, the offer being specific to the at least one of the channels of commerce.

31 Claims, 6 Drawing Sheets

GENERATING OFFERS FOR THE PURCHASE OF PRODUCTS

BACKGROUND

Products may be sold in different channels such as through an online merchant, a brick and mortar store, or order by telephone. Each of these channels are very different with respect to each other and may be operated using different information technology infrastructures.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
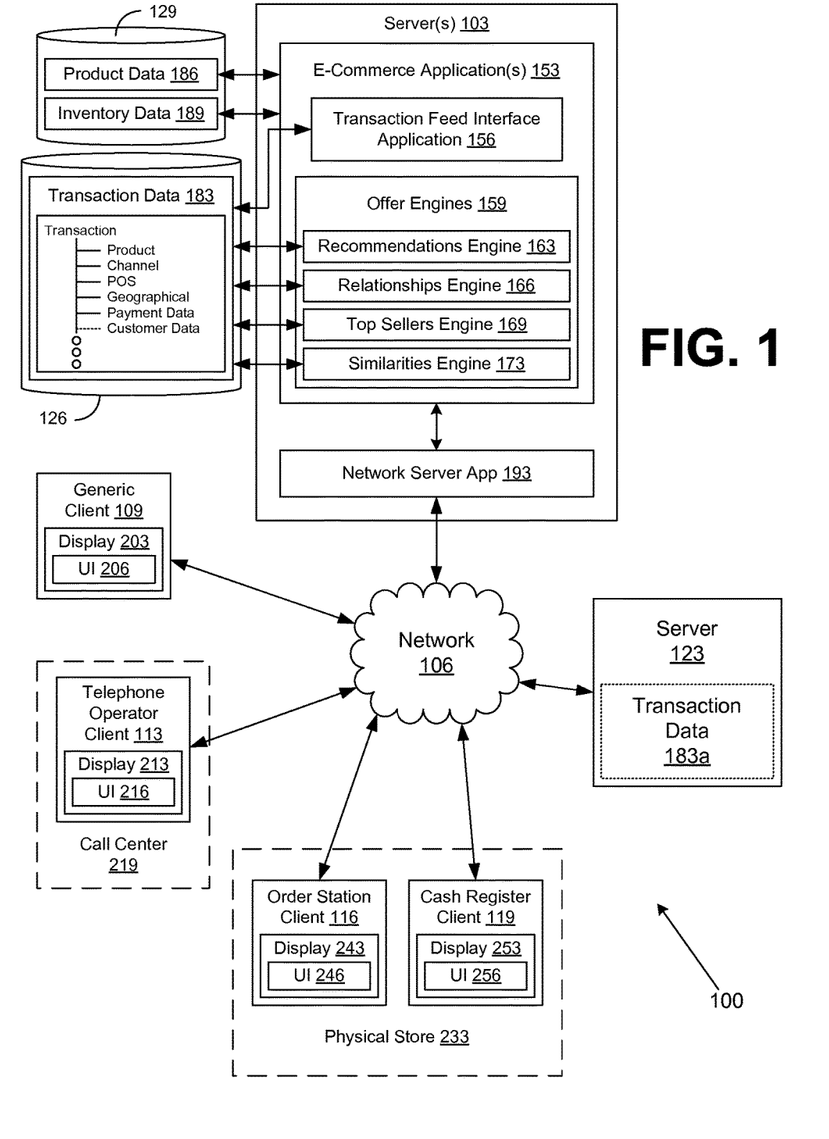
FIG. 1 is a drawing of an electronic commerce network according to various embodiments of the present disclosure.

With reference to FIG. 1, shown is one example of an electronic commerce network 100 according to various embodiments. The electronic commerce network 100 includes one or more servers 103 that are coupled to a network 106. In addition, various clients may be coupled to the network 106. For example, the clients may include a generic client 109, a telephone operator client 113, an order station client 116, a cash register client 119, or other types of clients. The network 106 may include, for example, the Internet, intranets, wide area networks (WANs), local area networks, wireless networks, or other suitable networks, etc., or any combination of two or more such networks.

Also coupled to the network 106 is a server 123 or other device that is included in merchant information technology infrastructure such as a network of servers, clients, and other equipment that operate as the information backbone of a merchant operation. Executed on the server 123 are one or more applications that facilitate data communication with other devices on the network 106 such as the server(s) 103 as will be described.

Although a single server 103 is depicted, it is understood that the server 103 may represent multiple servers, for example, that operate in a server bank or other arrangement. The server 103 accesses various data stores such as a transaction data store 126 and a product/inventory data store 129. In addition, the server 103 may access other data stores as can be appreciated. In accessing a data store, the server 103 may perform various functions such as intermediate build processes to build caches and intermediate representations of data, and other functions. The server 103 may comprise a server computer or other device with like capability.

Various applications are executed on the server 103 in order to respond to various requests and to interact with various components on the network 106. These applications include, for example, an e-commerce application 153, a transaction feed interface application 156, offer engines 159, and other applications.

The e-commerce applications 153 are executed in order to facilitate electronic commerce for products over the network 106 with respective clients. As contemplated herein, "products" may comprise goods or services. The e-commerce applications 153 may facilitate the operation of an online merchant who sells products, for example, over the Internet. In such case, the e-commerce applications 153 may include various subcomponents such as applications that implement order pipelines, inventory control subsystems, fulfillment subsystems, and other types of systems as can be appreciated.

Among the subcomponents of the e-commerce applications 153 are the transaction feed interface application 156 and the offer engines 159. The transaction feed interface application 156 is an application that is executed in order to interface with the server 123 of a merchant to obtain transaction data as will be described. The offer engines 159 include a recommendations engine 163, a relationships engine 166, a top sellers engine 169, and a similarities engine 173. During operation, the offer engines 159 access transaction data 183 that is stored in the data store 126 to generate offers including personalized offers for customers. In many cases, the offer engines 159 access subsets of the transaction data 183 to generate the offers as will be described. According to one embodiment, the offers relate to a product that is the subject of a pending transaction or other interaction with a customer. The specific functionality of the offer engines 159 is described in later text.

The transaction data 183 comprises records of transactions for the purchase of products through one or more channels of commerce as will be described. With respect to each transaction, various data is stored such as, for example, the product, the channel of commerce within which the transaction was conducted, the point of sale for the product, geographical location of the sale or delivery of the product, any information about the customer that purchased the product if available, payment information (including payment instrument information that may identify a customer), and potentially other information. In addition, during the operation of the e-commerce applications 153 in facilitating various transactions, various information from the product/inventory data store 129 may be accessed such as product data 186, inventory data 189, and other data.

Also executed on the servers 103 is a network server application 193 that acts as a gateway through which requests and data are received from various other devices on the network 106 and through which the server 103 communicates with such other devices. In this respect, the network server application 193 may comprise, for example, a web server or other appropriate network server as can be appreciated.

The generic client 109 may comprise, for example, a computer system, personal digital assistants, cellular telephones, or other devices with like capability that are typically not associated with a merchant as will be described. In this respect, it is typical that a customer who wishes to purchase a product may own or otherwise manipulate the generic client 109. The generic client 109 includes various components to facilitate rendering of data such as images and other information to be viewed by a user.

The clients as described herein may each include, for example, various rendering devices that can render data in a form that may be perceived by a user. As contemplated herein, the "rendering devices" may comprise, for example, display devices, printers, and other devices. For example, the generic client 109 may include such rendering devices such as a display device 203 upon which a user interface 206 may be rendered.

The telephone operator client 113 is similar to the generic client 109 in that it may comprise a computer system, personal digital assistants, cellular telephones, or like devices. Also, the telephone operator client 113 may include various rendering devices such as a display device 213 upon which a user interface 216 may be rendered. The telephone operator client 113 is typically located, for example, in a call center 219 or other environment as can be appreciated.

The order station client 116 and the cash register client 119 may be located at a physical store 233. In this respect, the physical store 233 comprises a location where customers purchase products as can be appreciated. The physical store 233 may comprise, for example, a building, kiosk, other any other location or structure adapted for the operation of a merchant. Alternatively, the order station client 116 may be placed in a location not associated with a physical store 233.

The order station client 116 may be located in a stand alone structure to facilitate the purchase of products through the e-commerce applications 153, for example, within the confines of a physical store 233. To this end, the order station client 116 may be located within a kiosk, included as part of a display, or made available to customers in some other manner. The order station client 116 includes rendering devices as described above. For example, the order station client 116 may include a display device 243 upon which various user interfaces 246 may be rendered.

The cash register client 119 may comprise a cash register that acts as a point of sale for merchandise in a physical store 233. The cash register itself may execute appropriate applications to act as a client within the electronic commerce network 100 in addition to performing its functions as a cash register. Similarly, the cash register client 119 may include a display device 253 that displays one or more user interfaces 256. The display device 253 may be positioned to be viewable, for example, by a sales clerk who controls the cash register client 119. Alternatively, the display device 253 may be positioned to be viewable by customers who stand at a counter, for example, to make a purchase at a point of sale. It may also be the case that the cash register client 119 includes both such display devices to enable the sales clerk to conduct a transaction with a customer and at the same time present other offers for other products to the customer based upon the products that are subject to the pending transaction or other interaction.

Stored in memory or mass storage associated with the server 123 is transaction data 183a. The transaction data 183a is associated with transactions for the purchase of products by a given merchant through various channels of commerce associated with such merchant. For example, such a merchant may own one or more retail outlets or stores through which merchandise is sold. The merchant may also maintain an information technology infrastructure including, for example, cash registers, servers, and other information technology infrastructure to track the transactions and inventory of the merchant. The transaction data 183a comprises records generated by such infrastructure of the various transactions for the purchase of products that have occurred over time. In addition, other information associated with the operation of the merchant may be stored as can be appreciated. Ultimately, the transaction data 183a is transmitted to the server 103 and is included as a portion of the transaction data 183 in the data store 126.

Next, a general discussion is provided about the concept of "channels of commerce" as this concept relates to the various embodiments. The various clients 109, 113, 116, 119 described above facilitate various channels of commerce. As contemplated herein, a "channel of commerce" refers to a mode of commercial interaction between a merchant and customers. Different channels of commerce may employ different infrastructure for the distribution and sale of products. A channel of commerce may involve the location of the customer and/or the merchant, the nature of the existence of the merchant, and the way the customer interacts with the merchant.

According to various embodiments, several different channels of commerce are contemplated herein. For example, one channel of commerce involves a direct order configuration in which a user of the generic client 109 manipulates the generic client 109 to interact with the e-commerce application 153 in order to generate an order for a product that is sold, for example, by an online merchant that operates the e-commerce application. Such a channel of commerce involves the generic client 109, the e-commerce applications 153, and fulfillment centers or materials handling facilities that facilitate the generation of transactions and the fulfillment of such transactions. Fulfillment of an order generally involves achieving shipment of a product to a desired destination address.

In another example, a channel of commerce may involve orders generated by telephone. In such a case, a call center 219 may be employed that includes telephone operators who take orders for items over the telephone. Such operators may then place an order using the telephone operator client 113 that interfaces with the e-commerce application 153 through the network 106. Specifically, customers call operators within the call center 219 who then take orders for products to be purchased by the customers over the telephone. The operators then manipulate the telephone operator clients 113 in order to interface with the e-commerce applications 153 to input an order for one or more products as can be appreciated. This channel of commerce is similar to a direct order configuration except the telephone operator acts as a middleman to generate an order, where fulfillment is similar to the fulfillment for the direct order configuration described above.

The physical store 233 comprises a different channel of commerce in which goods or services are sold by merchants. Such a channel of commerce may involve a manufacturer that sends products to distributors that in turn provide products to stores in a product distribution network. Also, such a channel of commerce involves the cash registers and other information technology used by a merchant to implement the transactions for such products.

The order station client 116 and the cash register client 119 may operate in much the same way as the generic client 109, where the difference is their location or integration with cash registers, etc. However, given the proximity of the order station client 116 and/or the cash register client 119 in the physical store 233, they are part of their own unique channel of commerce in which a point of sale occurs at the physical store 233, where such clients interface with the e-commerce applications 153 in order to order products that may be shipped to the physical store 233 or to other destination addresses designated by users.

Thus, the location of the order station client 116 or the cash register client 119 in the physical store 233 represents a different channel of commerce than is represented by the generic client 109 that interfaces directly with the e-commerce applications 153, where the generic client 109 has no affiliation with a given site or store, etc.

A channel of commerce may also be restricted to a portion of a distribution network, or it may entail the entire distribution network. For example, assume a merchant operates a distribution network that services a chain of stores. A channel of commerce may be restricted to a single store, a group of stores within a given geographical area, or other grouping of the stores. A channel of commerce may also comprise the entire chain of stores.

Keeping in mind the explanation of the concept of "channels of commerce" set forth above, next a discussion of the nature of the transaction data 183 stored in the transaction data store 126 is provided.

In particular, the transaction data 183 comprises a plurality of records of transactions for the purchase of products through the various channels of commerce. When a given channel of commerce involves the use of the e-commerce applications 153 such as when ordering products online through the generic client 109, the transaction data 183 associated with such a transaction is stored in the transaction data store 126 by the e-commerce applications 153. However, for other channels of commerce such as traditional sales of products through retail outlets, records of transactions may be maintained by a given merchant using the server 123 or other information technology infrastructure described above. Such transactions may be recorded or stored in the transaction data 183a maintained by the merchant.

According to some embodiments, the server 123 or other merchant information technology interacts with the transaction feed interface application 156 to provide the transaction data 183a to the e-commerce applications 153. The merchant may provide a "feed" or stream of transaction data 183a to the transaction feed interface application 156. Each transaction recorded in the transaction data 183a is marked or tagged with information about such transactions as may be relevant to the function of the offer engines 159 as will be described. Such information may comprise, for example, the channel of commerce associated with the transaction. In addition, each transaction in the transaction data 183 may further include information such as the geographical area within which the transaction occurred or where the product subject to the order was delivered. Also, some of the transactions in the transaction data 183 may indicate customer specific data that provides an identity of the customer. In addition, other information may be included in the transactions.

The transaction data 183a is uploaded to the transaction feed interface application 156 as a feed or streaming of data. The transaction feed interface application 156 proceeds to store such transaction data 183a as the transaction data 183 in the data store 126. The transaction data store 126 includes transaction data 183 associated with all of the various channels of commerce as described above. As a consequence, it is possible to generate offers in conjunction with pending transactions or other interactions using the transaction data 183 from all of the channels of commerce. Specifically, it is possible to provide offers based upon subsets of the transaction data 183 for given situations. For example, offers may be generated based upon a subset of the transaction data 183 that is associated with a predefined one of the channels of commerce. Alternatively, the subset of the transaction data 183 may involve those transactions associated with a geographical location, or may involve some other characteristic. These offers may be rendered on a respective display device 203, 213, 243, or 253 of an appropriate client during the consummation of new transaction as will be described.

Next, a general discussion of the operation of the various components of the electronic commerce network 100 is described with reference to specific scenarios in which a customer makes a purchase of one or more products through a respective one of these channels of commerce. In each of the channels of commerce, it is the case that a user may identify a product that they wish to purchase. During the course of the consummation of the pending transaction for such product or other interaction, one of the clients communicates information about the pending transaction or viewed products to the offer engines 159 of the e-commerce applications 153. In response, the offer engines 159 generate offers for other products associated with the product that is the subject of the pending transaction or that is being viewed by a customer, etc. The offers are then transmitted back to the client to be rendered for a user of the client. The offers may be presented in an attempt to inform the purchaser of additional purchasing opportunities that are related in some way with the item that is the subject of the pending transaction or other interaction. Further, the offers may be presented for multiple channels of commerce, geographical areas, or other factor, where the user may manipulate a user interface to select the channel of commerce or other factor for which they wish to view offers. The offers may be transmitted to a client in association with a specific transaction, or offers may be transmitted as a batch to clients and stored locally where, for example, such recommendations are more commonly generated, etc.

The offers may be generated by the offer engines 159 based upon the information about the pending transaction and/or viewed products, and based upon a subset of the transaction data 183. For example, the subset of the transaction data 183 may comprise all transactions conducted through a specified one of the channels of commerce. Alternatively, the subset of the transaction data 183 may comprise all transactions associated with a given geographical area. Still further, the subset of transactions may comprise all transactions conducted through a specified one of the channels of commerce and associated with a given geographical area. Further, the subset of the transaction data 183 used to generate the offers may be restricted to those transactions that occurred in physical stores 233. Such stores may be limited, for example, to those within a given geographical area or limited in some other manner.

This reflects the fact that buyers who purchase products through various channels of commerce may have different tastes. Consequently, offers generated in association with a pending transaction for a given product or in association with viewed products based upon subsets of the transaction data 183 for different channels of commerce, geographical regions, or other factors may yield different results. As a consequence, such offers are targeted more directly for a given customer and are more likely to result in greater sales.

In one scenario, the user manipulates the generic client 109 to interface with the e-commerce application 153. In this respect, the user may manipulate a browser on the generic client 109 to interact with the e-commerce applications 153 through the network server application 193. Assume that the user wishes to buy a particular product. The e-commerce application 153 will know the product selected by the user and may cause the offer engines 159 to generate offers associated with such a product viewed through the generic client 109. The offers may be generated based on multiple subsets of the transaction data 183 as described above. In one embodiment, a user interface may be presented that allows a user to select which set of offers they wish to view.

Assuming that the user provides their identity by logging onto the e-commerce applications 153, for example, the recommendations engine 163 may be executed in order to generate an offer for the customer based upon a subset of the transaction data 183 that indicates a prior purchase history of the customer. The recommendations engine 163 may also generate an offer based upon a click stream associated with a current or past sessions or interactions with the e-commerce applications 153. In order to generate recommendations to a customer, the recommendations engine 163 may interface with the top sellers engine 169 or the similarities engine 173 in order to identify a top seller or other product that the customer is more likely to purchase.

Alternatively, it may be the case that the identity of the customer is unknown. In such case, the relationships engine 166 may be employed to generate a recommendation for the purchase of additional products that are related to the given product. For example, such recommendations may entail products that complement the product. For example, such a recommendation may include a peripheral device where the product viewed is a computer system. Relationships may be explicit relationships (i.e. compatible parts of a product such as batteries that are compatible with a product). Relationships may also be derived such as parts or devices made by different manufacturers that can cooperate with each other.

The top sellers engine 169 may identify a best selling product within a category that is also associated with the product. For example, if the product is a widget, then the top sellers engine 169 may identify the best selling items that fall under the same product category as widgets. As a result, alternative widgets may be listed. The top sellers engine 169 may operate according to product hierarchies such that when a customer views products in a broad category encompassing a lot of different products (i.e. electronics), the top sellers in the broad category may be offered. Alternatively, where a customer views products of a narrow category (i.e. cameras), then the top sellers of the narrow category may be offered. The age of the sales data examined may be specified so that the top sellers are most relevant to current consumers.

Further, the similarities engine 173 may generate an offer for products that are similar to or somehow correlate to the product that is the subject of a pending transaction or is viewed by a customer in a detail page, etc. In this respect, the similarities engine 173 is configured to identify product affinities or correlations in purchase histories of customers. For example, the similarities engine may identify that, over time, customers that bought item A also bought item B. Also, the similarities engine 173 may examine search information from product searches performed online by customers. For example, it could determine that customers that viewed product A in a detail page often viewed or purchased product B. Such correlations between products can provide an indication as to a greater likelihood that a customer will purchase a given product based upon correlations with their past purchases or their current product searching and viewing, etc. As a consequence, once information is known about a customer, it is possible to present purchase recommendations based on the correlations identified based on the past purchases or viewing history of the customer or of other customers.

Each of the engines 163/166/169/173 may generate one or more offers that are presented to the user by way of a user interface 206 rendered on the display 203. During the course of the order process, the generic client 109 may transmit a request to the server 103 for the various offers that may be generated by the offer engines 159. In doing so, the generic client 109 may include a tag within the request that indicates a channel of commerce associated with the generic client 109. This channel of commerce is typically an online sales transaction.

The various offers generated by the respective engines 159 may each be included within a response to a request from the generic client 109. Such may be presented as a user interface 206 by presenting selection options to the user so that they may identify offers associated with given channels of commerce. In this respect, the offers generated by each of the offer engines 159 may be generated based upon separate subsets of the transaction data 183 for corresponding channels of commerce.

In another scenario, a user may call the call center 219 and an operator may take an order for a product over the telephone. Such operator may manipulate the telephone operator client 113 in order to place an order for the product discussed over the telephone. During the course of generating the transaction between the telephone operator client 113 and the e-commerce application 153, the telephone operator client 113 may send a request for an offer in association with the pending transaction for the purchase of the product or in association with products viewed. Also, the offer may be included automatically with detail pages or order pages generated in response to requests by the telephone operator client 113. According to one embodiment, telephone operator client 113 is configured to include a tag or other information in the request or other communication that indicates the channel of commerce associated with the pending transaction or other interaction at the telephone operator client 113. This tag may be employed to inform the offer engines 159 of the channel of commerce for the transaction so that offers may be generated using a subset of the transaction data 183 associated with the channel of commerce of the transaction.

Alternatively, a single user interface 216 may reveal the offers associated with a plurality of different channels of commerce. In one embodiment, one may select the given channel of commerce for which the offers is displayed as will be described. In such case, for example, the telephone operator who operates the telephone operator client 113 will be able to view the offers in a user interface 216 rendered on a display device 213 or rendered in some other manner. During the course of the conversation in which the operator takes the order from the individual over the telephone, the operator can then consult this information in order to suggest other items to be purchased.

In another scenario, a user may purchase products at a physical store 233 where a cash register client 119 exists at the point of sale. While a transaction is pending or during some other interaction, the cash register client 119 may transmit a request to the server 103 for one or more offers in association with the interaction for purchase of one or more products. The request may include a tag that indicates the channel of commerce associated with the interaction. The channel of commerce may be, for example, the retail outlet represented by the physical store 233. Based upon the tag placed in the request, the respective offer engines 159 generate the offers, for example, based upon the channel of commerce indicated in the request. The subset of the transaction data 183 is examined in order to generate the offers based upon the channel of commerce indicated in the request.

In an additional alternative, the respective cash register client 119 or other client may have a unique identifier associated therewith that is maintained in a memory associated with the servers 103. A default subset of the transaction data 183 may be associated with the identifier. This default subset of the transaction data 183 may be the subset that is used in generating the respective offers by virtue of the operation of the offer engines 159. In such case, the request for the offers generated by the cash register client 119 or other client may comprise the identifier associated with the cash register client 119. Upon receiving a request with the identifier, the e-commerce application 153 may be configured to look up the subset of transaction data 183 based on the identifier that is to be consulted in order to generate the offers based upon the operation of the offer engines 159. In this respect, a default subset of the transaction data 183 may be specified for the given channel of commerce from which the request was generated.

The request for the offer from a client such as the cash register client 119 may also include a tag or other indicator that indicates a rendering capability of the client itself. In this respect, the offer generated by the respective offer engines 159 in response to the request may be generated in a format that is compatible with the rendering capability of the respective client. For example, if a cash register client 119 includes a first display device 253 that faces the clerk and a second display device 253 that faces the customer, then it may be desirable to receive recommendations that can be rendered on the second display device 253 for the customer as well as the display device 253 for the store clerk. It may be the case that the formats necessary to successfully render such images on the respective display devices 253 are different, depending upon screen size and other parameters, etc. In addition, the compatibility issue applies to all other types of clients as well.

Figure 2:
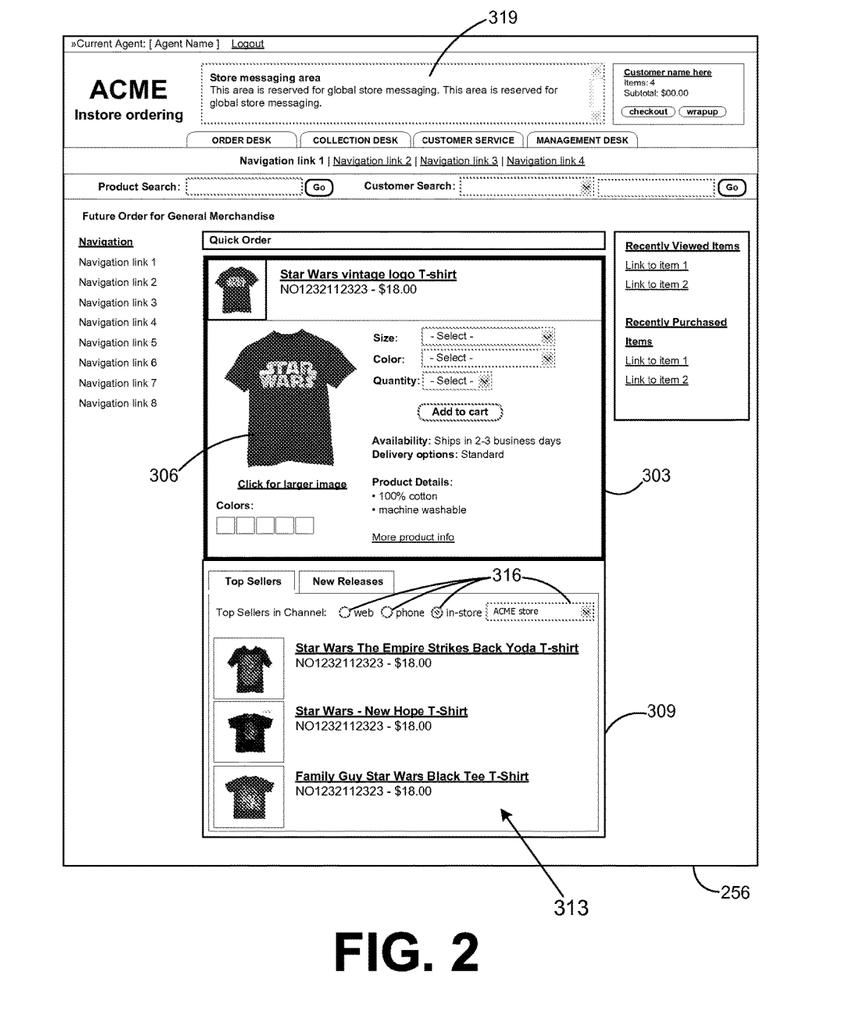
FIG. 2 is a drawing that provides one example of a user interface that is rendered on a client in the electronic commerce network of FIG. 1 according to various embodiments of the present disclosure.

With reference next to FIG. 2, shown is one example of a user interface 256 that may be generated, for example, on a cash register client 119 that is viewed by a clerk of the physical store 233 who controls the cash register client 119. The user interface 256 includes a product window 303 in which a product 306 is viewed. The product 306 is depicted along with graphical components that may be manipulated to implement the purchase of a product 306.

The user interface 256 also includes an offer window 309. The offer window 309 includes offers 313. The offer window 309 also includes channel selectors 316 that may be manipulated to identify the offers 313 associated with the respective one of the channels of commerce as described above. The user interface 256 may also include a message window 319 in which specific information for the store clerk may be relayed.

Upon generating the user interface 256 on the display device 253 of the cash register client 119, a user may manipulate the channel selectors 316 to identify a specific channel of commerce for which the offers 313 are displayed. Initially, the offers 313 of a default one of the channels of commerce may be displayed. As shown, the channel selectors 316 include orders taken over the Internet, orders taken by telephone, and purchases made in-store. With respect to in-store purchases, the specific store or cluster of stores may be selected. Alternatively, further selectors may be provided that identify geographical areas and other information as can be appreciated.

In one embodiment, a single response provided to a given client will include each of the offers generated by the offer engines 159 for each one of the various channels of commerce as shown. As such, a user may manipulate the channel selectors 316 to display the offers 313 associated with a respective one of the channels of commerce. Alternatively, a default one of the channel selectors 316 may be selected when the user interface 256 is initially rendered. Such channel of commerce may be a default channel of commerce associated with the respective cash register client 119 or other client as described above. Upon selection of other channel selectors 316, the respective client may transmit a further request for the offers 313 for such channels of commerce as can be appreciated.

In this manner, the store clerk can discuss with a customer the offers 313 associated with the product 306. In particular, store personnel can discuss the various types of products that are sold over the Internet, by telephone, or in-store, or via other channels not described herein. Note that where the cash register client 119 includes a second display device 253 to be viewed by a customer, a portion of the user interface 256 may be viewed on such second display device 253. Note that although FIG. 2 illustrates "top sellers," it is possible that other offers may be depicted such as related products, similarities, or personal recommendations.

Figure 3:
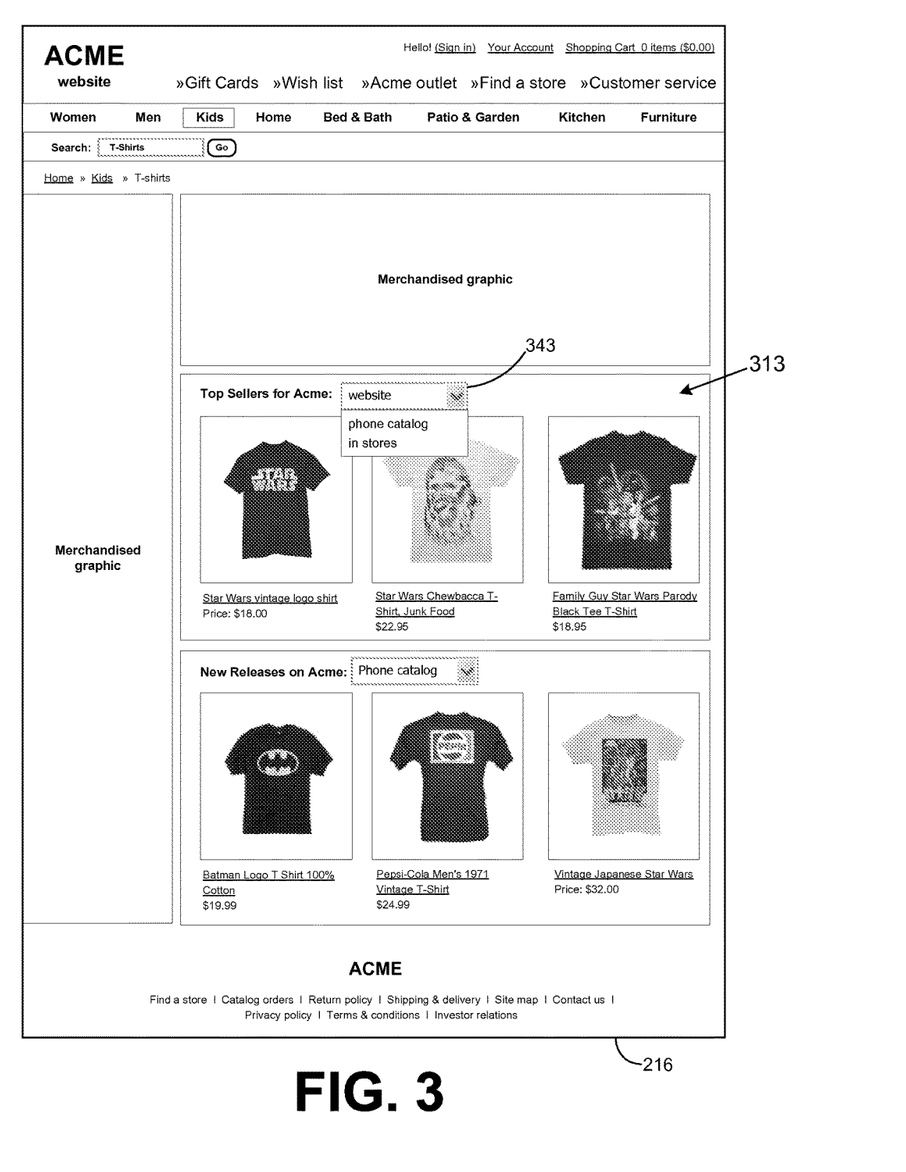
FIG. 3 is a drawing that provides another example of a user interface that is rendered on a client in the electronic commerce network of FIG. 1 according to various embodiments of the present disclosure.

With reference to FIG. 3, shown is an alternative user interface 216 that is generated, for example, on the display device 213 (FIG. 1) of the telephone operator client 113 (FIG. 1) according to one embodiment. As shown, offers 313 are depicted in a manner similar to that described above with respect to FIG. 2. Also, a channel selector 333 allows a user to select a given channel of commerce for which the offers 313 are displayed in a similar manner described above with respect to FIG. 2.

Figure 4:
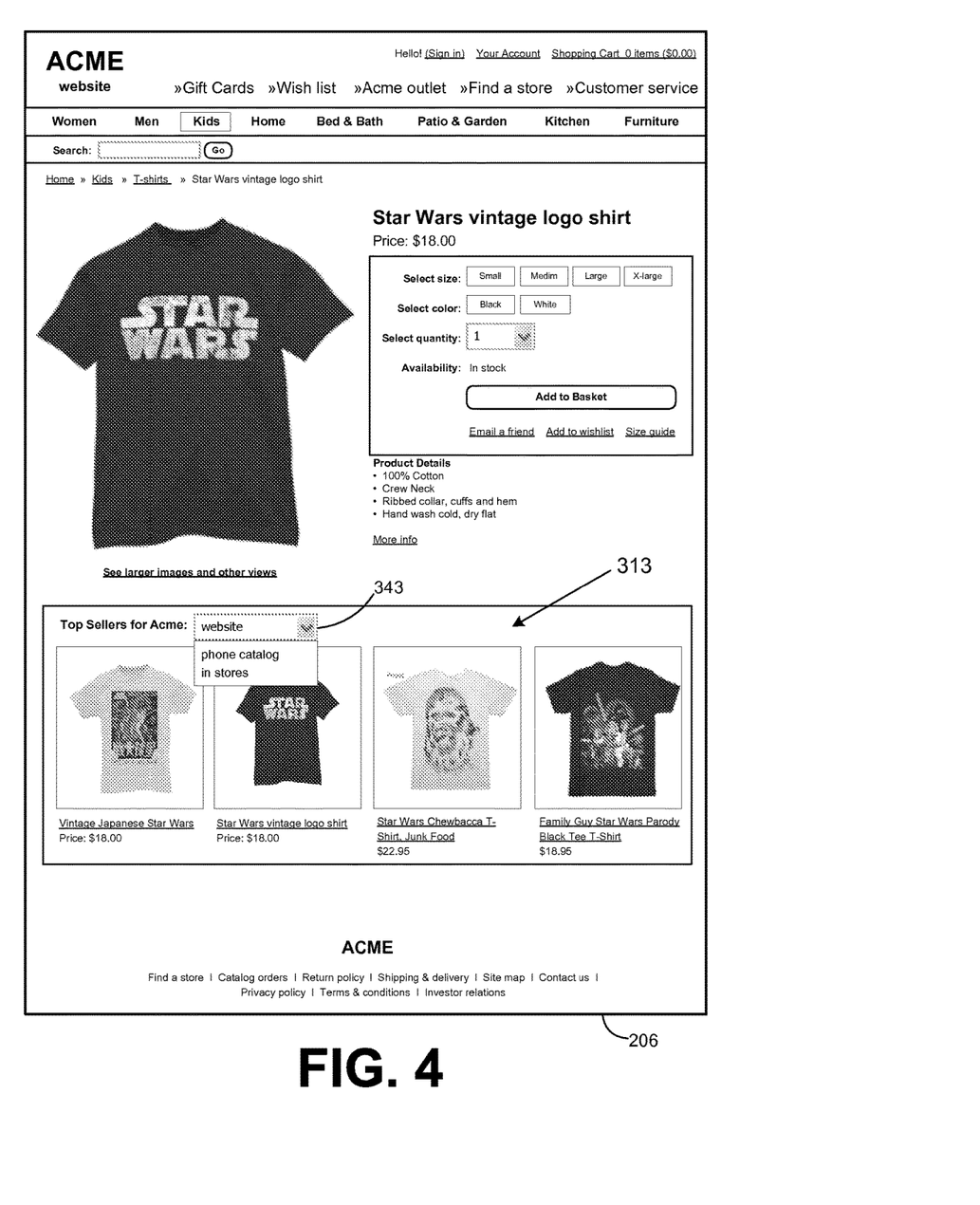
FIG. 4 is a drawing that provides still another example of a user interface that is rendered on a client in the electronic commerce network of FIG. 1 according to various embodiments of the present disclosure.

Referring next to FIG. 4, shown is one additional alternative of the user interface 206 that may be rendered on a display device 203 (FIG. 1) of a generic client 109 (FIG. 1) according to one embodiment. As shown, the user interface 206 includes a window that displays offers 313 and a channel selector 343 in a similar manner described above with respect to FIG. 3. Also, the various components are depicted to facilitate the purchase of the item as can be appreciated.

Thus, with reference to FIGS. 1-4, the various embodiments provide various benefits in that users may see what other individuals are purchasing through channels of commerce that are most closely associated to the users themselves. For example, if a user usually buys their clothes from a given store and they are fashion conscious, they may wish to know what are the top selling items from such store. Similarly, if a user wishes to know what are the top selling items in a given geographical area, such information may further be obtained. In addition, recommendations may be received based upon how products are related, similarities between products, and recommendations based upon personal buying habits as described above.

Figure 5:
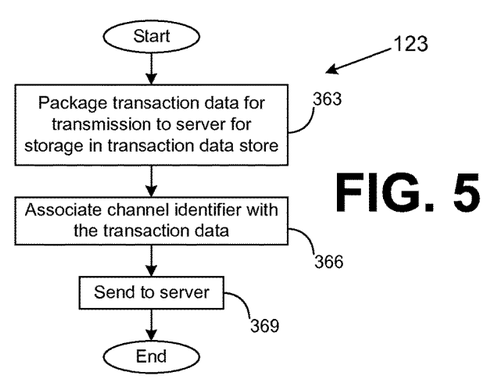
FIG. 5 is a flow chart that depicts one example of functionality implemented on a server in the electronic commerce network of FIG. 1 according to various embodiments of the present disclosure.

With reference next to FIG. 5, shown is a flow chart that provides one example of functionality implemented in the server 123 (FIG. 1) according to an embodiment of the present disclosure. Alternatively, the flow chart of FIG. 5 may be viewed as depicting steps of an example of a method implemented in the server 123 to transmit the transaction data 183a (FIG. 1) to the server 103 (FIG. 1) according to one embodiment.

The functionality of FIG. 5 is implemented to send the transaction data 183a to the transaction feed interface application 156 (FIG. 1) for storage as part of the transaction data 183 (FIG. 1). In particular, in box 363, all transaction data is packaged for transmission to the server 103 (FIG. 1) for storage as the transaction data 183 in the transaction data store 126 (FIG. 1). In this respect, such transaction data 183a may be embodied within a predefined XML format, or other format as can be appreciated.

Thereafter, in box 366, a channel identifier is associated with the transaction data 183a. In particular, the channel identifier identifies the specific channel of commerce associated with the given transaction. Thus, for each transaction contained within the transaction data 183a, a respective channel identifier is associated therewith. Thereafter, in box 369, the transaction data 183a is transmitted to the server 103. In this manner, the transaction data 183 includes all transaction data associated with channels of commerce that are outside the operation of the e-commerce applications 153.

Figure 6:
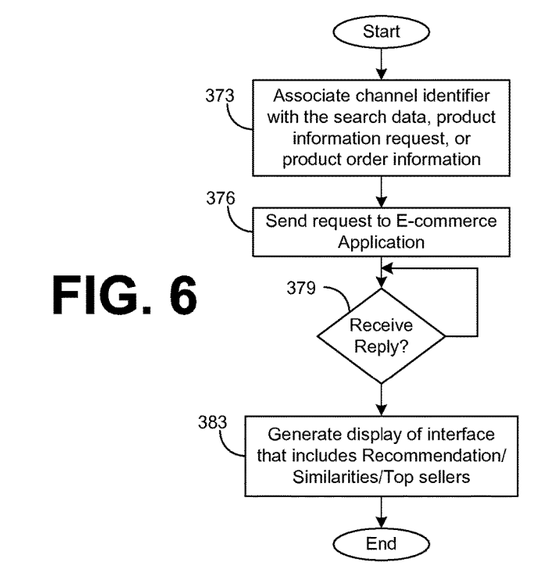
FIG. 6 is a flow chart that depicts one example of functionality implemented on a client in the electronic commerce network of FIG. 1 according to various embodiments of the present disclosure.

With reference to FIG. 6, shown is a flow chart that provides one example of functionality implemented in one of the clients 109, 113, 116, or 119 (FIG. 1) according to an embodiment of the present disclosure. Alternatively, the flow chart of FIG. 6 may be viewed as depicting steps of an example of a method implemented in one of the clients 109, 113, 116, or 119 according to one embodiment.

In particular, the functionality of FIG. 6 depicts how a client transmits a channel identifier or other information to the servers that allows the offer engines 159 to identify the subset of the transaction data 183 (FIG. 1) that is to be accessed in generating the offers to be sent to the client in response to the request to be rendered to a user.

Beginning with box 373, the respective client associates a channel identifier with search data requesting a search for a product, a product information request, or a product order information request. Thereafter, in box 376, the request is sent to the e-commerce application 153 (FIG. 1). In box 379, the client waits to receive a reply back from the server 103. If a timeout period occurs, then an error results. In box 383, assuming that the reply is received, then a display of an appropriate interface 206, 216, 246, or 256 is rendered on an appropriate device associated with a given client 109, 113, 116, or 119 that includes an offer associated with current viewed product or transaction as described above. Thereafter, the flowchart of FIG. 6 ends as shown.

With respect to FIGS. 5 and 6, it should be understood that the functionality depicted is merely one example of the various different types of functionality that may be implemented on the server 103, the server 123, or the clients 109, 113, 116, or 119.

Figure 7:
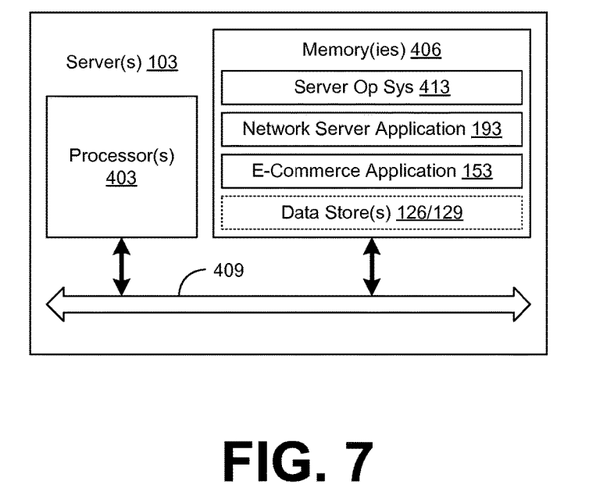
FIG. 7 is a schematic block diagram that depicts one example of a server in the electronic commerce network of FIG. 1 according to various embodiments of the present disclosure.

Referring next to FIG. 7, shown is a schematic block diagram of one example of a server 103 according to an embodiment of the present disclosure. The server 103 includes a processor circuit, for example, having a processor 403 and a memory 406, both of which are coupled to a local interface 409. To this end, the server 103 may comprise, for example, a server computer with such structure. The local interface 409 may comprise, for example, a data bus with an accompanying address/control bus as can be appreciated.

Stored in the memory 406 are several components that are executable by the processor 403 or that are stored within the memory 406. In particular, stored in the memory 406 are a server operating system 413, the network server application 193, and the e-commerce application 153. Also, the data stores 126, 129 may be stored in the memory 406. It is understood that there may be other applications that are stored in the memory 406 and are executable by the processor 403 as can be appreciated. Also, other data may be stored in the memory 406 and accessed by the processor 403. According to one embodiment, each of the data stores 126, 129 may comprise, for example, a database or other appropriate data storage structure. Where any component discussed herein is implemented in the form of software, any one of a number of programming languages such as, for example, C, C++, Java, Java Script, Perl, Python, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components such as the e-commerce application 153 and various functionality implemented on clients as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and/or flow charts of FIGS. 1-7 show the architecture, functionality, and operation of an implementation of the e-commerce application 153 and various functionality implemented on clients. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the e-commerce application 153 and various functionality implemented on clients comprises software or code, the same can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
storing transaction data in a data store, the transaction data comprising a record of a plurality of transactions for purchasing products through a plurality of channels of commerce;
receiving in at least one computing device a request from a client for an offer to sell a first product in association with an interaction involving a second product;
receiving in the at least one computing device a selection of one of the channels of commerce for which a customer wishes to receive the offer, the request including a tag indicating the one of the channels of commerce, and the customer being associated with the client; and
generating the offer in the at least one computing device in response to the request, the offer being specific to the one of the channels of commerce:
determining a default subset of the transaction data associated with the one of the channels of commerce from which the offer is generated, the default subset of the transaction data being restricted to the transactions conducted through a respective one of the channels of commerce that is associated with a geographical area;
identifying at least one other product that is similar to the second product involved in the interaction;
identifying at least one other product that is related to the second product involved in the interaction; and
identifying a best selling product within a category associated with the second product involved in the interaction, where the best selling product is identified from among a plurality of past sold products indicated in the default subset of the transaction data for the category.

2. The method of claim 1, wherein the request further includes information that indicates an identity of the customer associated with the interaction, where generating the offer in response to the request further comprises generating a recommendation for a purchase of an additional product based at least in part upon a subset of the transaction data that indicates a prior purchase history of the customer.

3. A method, comprising:
storing transaction data in a data store, the transaction data comprising a record of a plurality of transactions for purchasing products through a plurality of channels of commerce;
receiving in at least one computing device a request from a client for an offer to sell a first product in association with an interaction involving a second product;
receiving in the at least one computing device a selection of at least one of the channels of commerce for which a customer wishes to receive the offer, the request including a tag indicating the one of the channels of commerce, and the customer being associated with the client; and
generating the offer in the at least one computing device in response to the request, the offer being specific to the at least one of the channels of commerce, the first product being identified based at least in part on a subset of the transaction data associated with the at least one of the channels of commerce, the subset of the transaction data being restricted to the transactions conducted through a respective one of the channels of commerce that is associated with a geographic area.

4. The method of claim 3, wherein generating the offer in response to the request further comprises determining a default subset of the transaction data associated with the at least one of the channels of commerce from which the offer is generated.

5. The method of claim 3, wherein generating the offer in response to the request further comprises determining the subset of the transaction data from which the offer is generated for the at least one of the channels of commerce.

6. The method of claim 3, wherein the at least one of the channels of commerce comprises a physical store operated by a merchant.

7. The method of claim 3, wherein the at least one of the channels of commerce comprises a plurality of physical stores operated by a merchant.

8. The method of claim 3, wherein the request further includes a tag indicating a rendering capability of the client, where generating the offer in response to the request further comprises generating the offer in a format that is compatible with the rendering capability of the client.

9. The method of claim 3, wherein generating the offer in response to the request further comprises identifying at least one other product that is similar to the second product involved in the interaction.

10. The method of claim 3, wherein generating the offer in response to the request further comprises identifying at least one other product that is related to the second product involved in the interaction.

11. The method of claim 3, wherein generating the offer in response to the request further comprises identifying a best selling product within a category associated with the second product involved in the interaction.

12. The method of claim 11, wherein the best selling product is identified from among a subset of the transaction data for the category, the subset of the transaction data for the category being limited to a geographical area.

13. The method of claim 11, wherein the best selling product is identified from among a subset of the transaction data for the category, the subset of the transaction data for the category being limited to the at least one of the channels of commerce.

14. The method of claim 3, wherein the request further includes information that indicates an identity of the customer associated with the interaction, where generating the offer in response to the request further comprises generating a recommendation for a purchase of an additional product based at least in part upon a subset of the transaction data that indicates a prior purchase history of the customer.

15. A system, comprising:
a server;
a data store accessible to the server;
transaction data stored in the data store, the transaction data comprising a record of a plurality of transactions for a purchase of products through a plurality of channels of commerce; and
an offer system executable in the server, the offer system comprising logic that generates an offer in response to a request for an offer to sell a first product and in response to a selection of at least one of the channels of commerce for which a customer wishes to receive the offer, the customer being associated with a client, the request and the selection being received in the server from the client, the request being associated with an interaction involving a second product and including a tag indicating the at least one of the channels of commerce associated with the interaction, the offer being specific to the at least one of the channels of commerce, the first product being identified based at least in part on a subset of the transaction data, the subset of the transaction data being restricted to the transactions conducted through a respective one of the channels of commerce that is associated with a geographic area.

16. The system of claim 15, wherein the logic that generates the offer in response to the request further comprises logic that determines a default subset of the transaction data associated with the at least one of the channels of commerce from which the offer is generated.

17. The system of claim 15, wherein the logic that generates the offer in response to the request further comprises logic that determines the subset of the transaction data from which the offer is generated for the at least one of the channels of commerce.

18. The system of claim 15, wherein the at least one of the channels of commerce comprises a physical store operated by a merchant.

19. The system of claim 15, wherein the at least one of the channels of commerce comprises a plurality of physical stores operated by a merchant.

20. The system of claim 15, wherein the at least one of the channels of commerce comprises an online store.

21. The system of claim 15, wherein the at least one of the channels of commerce comprises purchase by telephone.

22. The system of claim 15, wherein the logic that generates the offer in response to the request further comprises logic that identifies at least one other product that is related to the second product involved in the interaction.

23. The system of claim 15, wherein the logic that generates the offer in response to the request further comprises logic that identifies at least one other product that is similar to the second product involved in the interaction.

24. The system of claim 15, wherein the logic that generates the offer in response to the request further comprises logic that identifies a best selling product within a category associated with the second product involved in the interaction.

25. The system of claim 24, wherein the best selling product is identified from among a subset of the transaction data for the category, the subset of the transaction data for the category being limited to a geographical area.

26. The system of claim 24, wherein the best selling product is identified from among a subset of the transaction data for the category, the subset of the transaction data for the category being limited to the at least one of the channels of commerce.

27. The system of claim 15, wherein the request further includes information that indicates an identity of the customer associated with the interaction, wherein the logic that generates the offer in response to the request further comprises logic that generates a recommendation for a purchase of an additional product based at least in part upon a subset of the transaction data that indicates a prior purchase history of the customer.

28. The method of claim 3, further comprising rendering in the at least one computing device a user interface to facilitate the selection of the at least one of the channels of commerce.

29. The method of claim 3, further comprising receiving in the at least one computing device a selection of the geographic area.

30. The system of claim 15, wherein the offer system further comprises logic that renders a user interface to facilitate the selection of the at least one of the channels of commerce.

31. The system of claim 15, wherein the offer system further comprises:
- logic that receives the selection of the at least one of the channels of commerce for which the customer wishes to receive the offer; and
- logic that receives a selection of the geographic area.

* * * * *